(12) United States Patent
Liu et al.

(10) Patent No.: US 10,606,420 B2
(45) Date of Patent: Mar. 31, 2020

(54) TOUCH DISPLAY PANEL

(71) Applicant: ILI TECHNOLOGY CORP., Hsinchu County (TW)

(72) Inventors: Chi Kang Liu, Hsinchu County (TW); Guo-Kiang Hung, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 722 days.

(21) Appl. No.: 14/800,915

(22) Filed: Jul. 16, 2015

(65) Prior Publication Data

US 2016/0019854 A1 Jan. 21, 2016

Related U.S. Application Data

(60) Provisional application No. 62/027,236, filed on Jul. 21, 2014.

(51) Int. Cl.
- *G09G 3/36* (2006.01)
- *G06F 3/044* (2006.01)
- *G06F 3/041* (2006.01)
- *G02F 1/1333* (2006.01)

(52) U.S. Cl.
CPC .......... *G06F 3/044* (2013.01); *G02F 1/13338* (2013.01); *G06F 3/0412* (2013.01); *G06F 3/0416* (2013.01); *G06F 3/0418* (2013.01); *G09G 3/3614* (2013.01); *G09G 3/3648* (2013.01); *G06F 2203/04101* (2013.01); *G06F 2203/04103* (2013.01); *G06F 2203/04105* (2013.01); *G06F 2203/04107* (2013.01); *G06F 2203/04111* (2013.01); *G09G 2300/043* (2013.01); *G09G 2300/0408* (2013.01); *G09G 2310/0202* (2013.01); *G09G 2310/08* (2013.01)

(58) Field of Classification Search
CPC ................ G06F 2203/04107; G06F 3/0412
See application file for complete search history.

(56) References Cited

U.S. PATENT DOCUMENTS

| 9,229,590 B2* | 1/2016 | Kim ....................... G06F 3/0412 |
| 2012/0075214 A1* | 3/2012 | Kim .......................... G06F 3/041 345/173 |
| 2014/0111466 A1* | 4/2014 | Kim ......................... G06F 3/044 345/174 |

(Continued)

FOREIGN PATENT DOCUMENTS

| CN | 101673013 | 3/2010 |
| CN | 103455189 | 12/2013 |
| TW | 201222646 | 6/2012 |

(Continued)

*Primary Examiner* — Amare Mengistu
*Assistant Examiner* — Shawna T Stepp Jones
(74) *Attorney, Agent, or Firm* — JCIPRNET

(57) ABSTRACT

A touch display panel includes a substrate, a plurality of data lines, a plurality of touch sensing lines, and a plurality of gate lines. The data lines are disposed above the substrate, and extend along a first direction. The touch sensing lines are disposed above the substrate, extend along a second direction different from the first direction, and intersect with the data lines. The gate lines are disposed above the substrate, extend along the second direction, and intersect with the data lines. The touch sensing lines or the gate lines and the data lines form touch sensing elements.

16 Claims, 15 Drawing Sheets

(56) References Cited

U.S. PATENT DOCUMENTS

2014/0168539 A1\* 6/2014 Kim .................. G06F 3/041
349/12
2017/0060289 A1\* 3/2017 Shin .................. G06F 3/044

FOREIGN PATENT DOCUMENTS

| TW | I409533 | 9/2013 |
| TW | 201423537 | 6/2014 |

\* cited by examiner

TOUCH DISPLAY PANEL

This application claims the benefit of U.S. Provisional Application Ser. No. 62/027,236, filed Jul. 21, 2014, the subject matter of which is incorporated herein by reference.

BACKGROUND OF THE INVENTION

Field of the Invention

The invention relates in general to a touch display panel, and more particularly, to a touch display panel in which a touch sensing element is formed by a touch sensing line or a gate line and a data line.

Description of the Related Art

A conventional touch display panel is formed by directly adhering a touch panel with a display panel. The overall thickness and weight of the panels are greater than those of one single display panel, resulting in a burden in user portability. There are currently display panels integrated with the touch control function. However, an additional touch sensing circuit is an independent unit outside a driving circuit of the display panel. Further, as the touch sensing circuit needs metal conducting lines in different directions to penetrate through vias and connect unconnected transparent electrode blocks, the resolution of display pixels is limited. Moreover, a touch sensing circuit likely interferes with a driving circuit and thus causes unstable display images.

SUMMARY OF THE INVENTION

It is a primary object of the present invention to provide a touch display panel. Without interfering with functions of a display panel, the touch display panel of the present invention realizes a touch function and at the same time reduces the thickness and weight of the touch display panel.

To achieve the above object, the present invention provides a touch display panel. The touch display panel includes a first substrate, a plurality of data lines, a plurality of touch sensing lines, a plurality of gate lines and a plurality of thin-film transistors (TFTs). The data lines are disposed above the first substrate, and extend along a first direction. The touch sensing lines are disposed above the first substrate, and extend along a second direction different form the first direction. The touch sensing lines further intersect with the data lines such that the touch sensing lines and the data lines form respective touch sensing elements. The gate lines are disposed above the first substrate, extend along a second direction, and intersect with the gate lines and the data lines. The TFTs are disposed above the first substrate, and are disposed adjacently to intersections of the gate lines and the data lines. Each of the TFTs includes a gate, a source and a drain. Each of the gates is electrically connected to one of the adjacent gate lines, and each of the sources is electrically connected to one of the adjacent data lines.

To achieve the above object, the present invention further provides a touch display panel. The touch display panel includes a first substrate, a plurality of data lines, a plurality of gate lines, a plurality of TFTs, a plurality of pixel electrodes, at least one common line, and a shielding pattern. The data lines are disposed above the first substrate, and extend along a first direction. The gate lines are disposed above the first substrate, and extend along a second direction different from the first direction. The gate lines further intersect with the data lines, such that the gate lines and the data lines form respective touch sensing elements. The TFTs are disposed above the first substrate, and are disposed adjacently to intersections of the gate lines and the data lines. Each of the TFTs includes a gate, a source and a drain. Each of the gates is electrically connected to one of the adjacent gate lines, and each of the sources is electrically connected to at least one of the adjacent data lines. The pixel electrodes are disposed above the first substrate, and are electrically connected to the drains. The common line is disposed above the first substrate. The shielding pattern is disposed between the touch sensing element and the pixel electrodes, and is electrically connected to the common line.

In the touch display panel of the present invention, the data lines may be utilized to transmit integrated signals including touch driving signals and pixel voltage signals, and the gate lines or touch sensing lines may be utilized to transmit sensing signals. Thus, the data lines and the gate lines or the touch sensing lines may form touch sensing elements. Therefore, the touch display panel of the present invention eliminates a touch control electrode layer originally for transmitting the touch driving signals to further effectively reduce the thickness, weight and production costs of the touch display panel.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
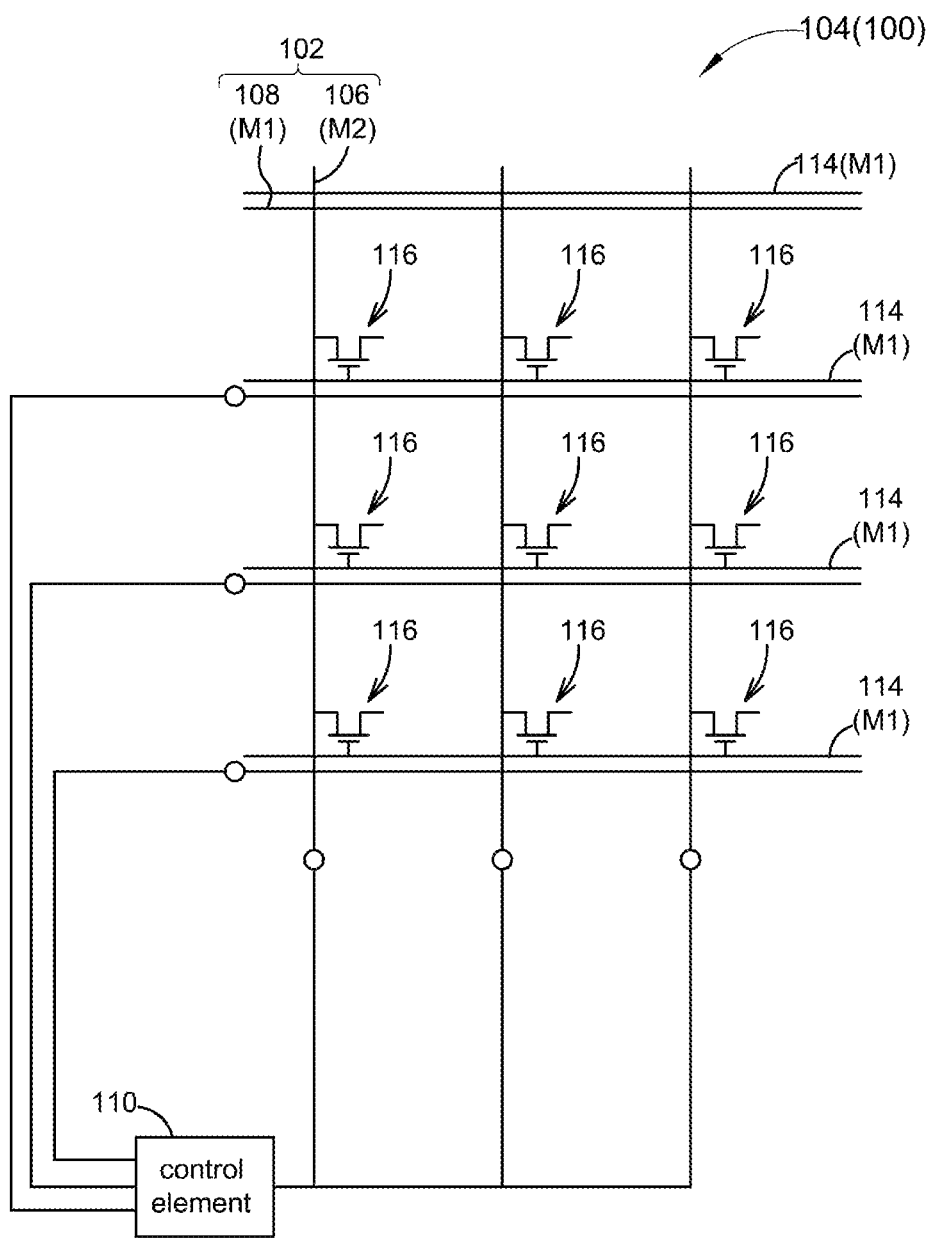
FIG. 1 is a circuit diagram of a touch display panel according to a first embodiment of the present invention.
Figure 2:
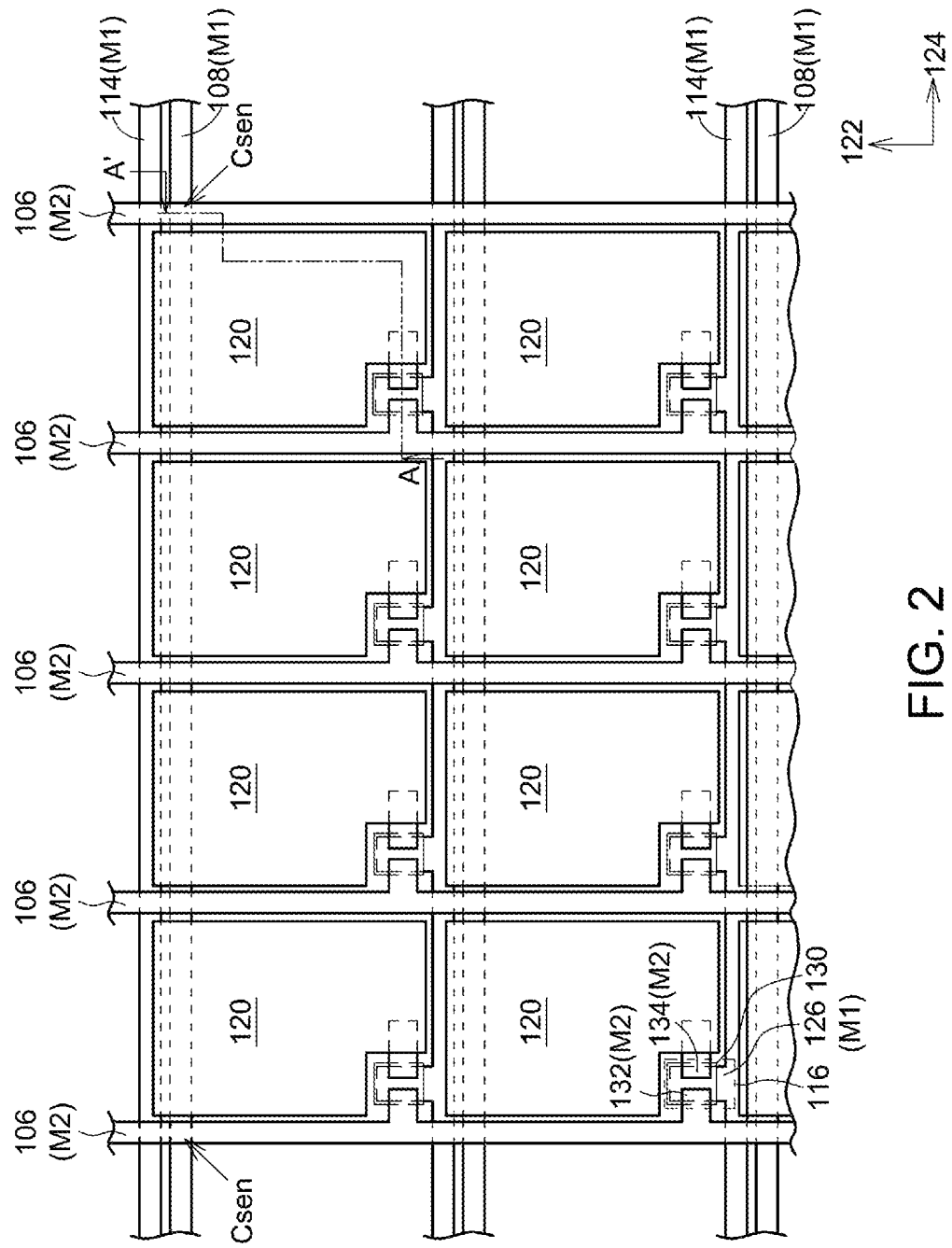
FIG. 2 is a top view of a touch display panel according to the first embodiment of the present invention.

Referring to FIG. 1 and FIG. 2, a touch display panel 100 according to the embodiment integrates a touch sensing element 102 to an array substrate 104, such that the touch display panel 100 provides a touch sensing function. More specifically, the array substrate 104 includes a plurality of data lines 106 and a plurality of touch sensing lines 108. The touch sensing lines 108 may intersect and further couple with the data lines to respectively form the touch sensing elements 102. The data lines 106 may transmit touch driving signals in an individually sequential or grouped sequential manner, i.e., the touch driving signals may be sequentially transmitted in a unit of one data line or one group formed by a plurality of data lines, and the touch sensing lines 108 interact with the touch driving signals through respective sensing capacitors Csen formed by the touch sensing lines 108 coupling with the data lines 106 to further transmit sensing signals. When a touching object approaches or touches the touch display panel 100, the sensing signals are changed, and a position of the touching object can be accordingly learned. Correspondingly, the touch sensing lines 108 may also sense the touch driving signals in an individually sequential or grouped sequential manner. The touch sensing lines 108 of the same group may be electrically connect to one another on the array substrate 104, at a position where the array substrate 104 connects to an external rear-end calculation integrated circuit, or in a rear-end calculation integrated circuit to generate one single sensing signal. In one embodiment, the data lines 106 may simultaneously transmit the touch driving signals, such that the touch sensing lines 108 sequentially transmit the sensing signals or a calculation unit in a rear-end calculation integrated circuit that calculates the position of the touch object sequentially receives or calculates the sensing signals. In another embodiment, a part of the data lines 106 and a part of the touch sensing lines 108 may be selected to implement touch sensing. Further, at time points different from those at which the touch driving signals are transmitted, the data lines 106 transmit the pixel voltage signals for controlling the display of pixels. In the embodiment, the data lines 106 and the touch sensing lines 108 are electrically connected to a control element 110. The control element 110 provides the integrated signals of the touch driving signals and the pixel voltage signals to the data lines 106, and receives the sensing signals sensed by the touch sensing lines 108. In another embodiment, the control element may serve for touch sensing only. At this point, the array substrate may further include a plurality of switching elements and a display control element, which switch to electrically connect the data lines to the display control element when the data lines transmit the pixel voltage signals, and switch to electrically connect the data lines to the control element when the data lines transmit the touch driving signals.

Figure 3:
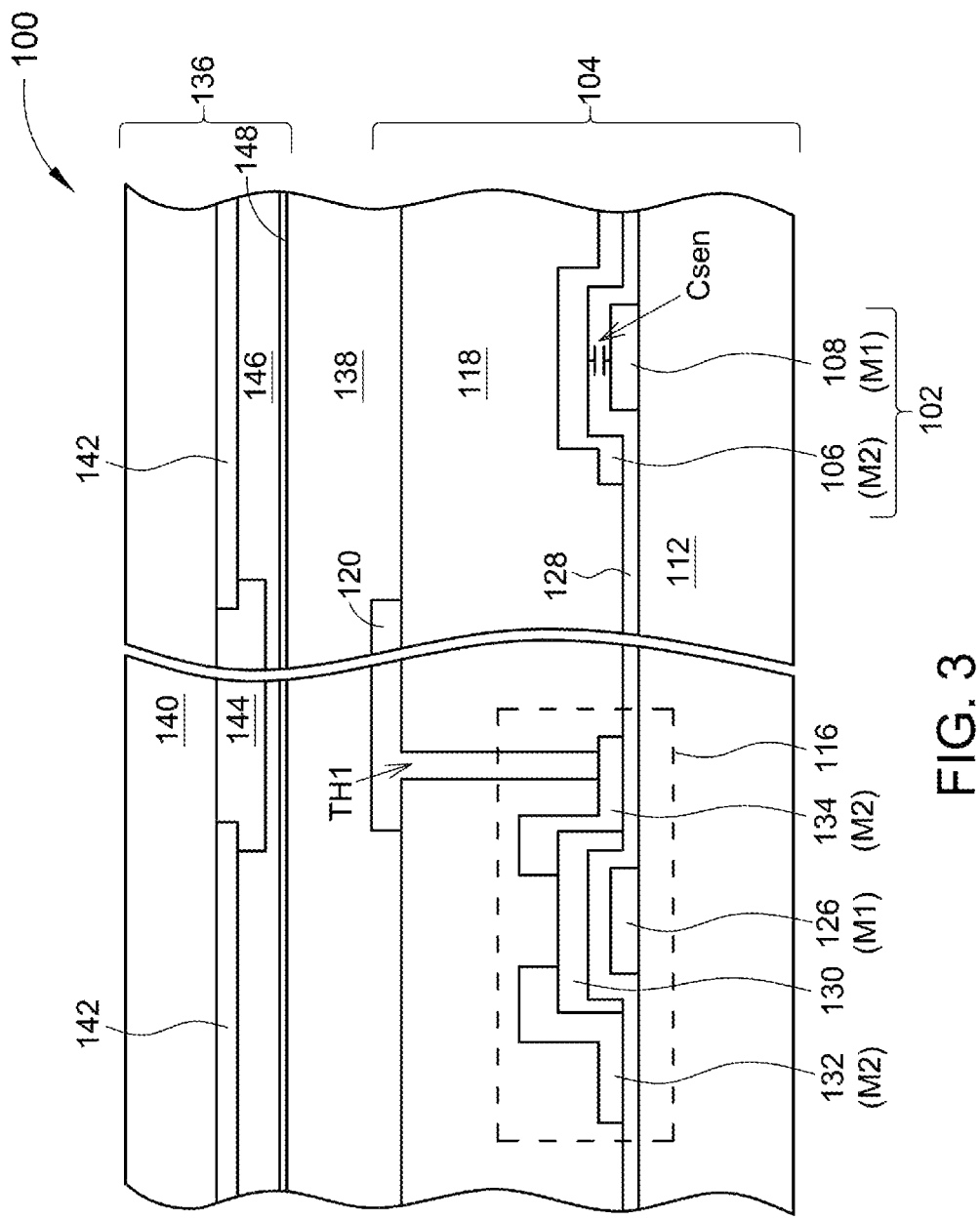
FIG. 3 is a section view along a section line A-A' in FIG. 2.

Also referring to FIG. 3, as shown in FIG. 1 to FIG. 3, the array substrate 104 may further include a first substrate 112, a plurality of gate lines 114, a plurality of thin-film transistors (TFTs) 116, a first dielectric layer 118, and a plurality of pixel electrodes 120. The data lines 106 are disposed above the first substrate 112, and extend along a first direction 122. The touch sensing lines 108 are disposed above the first substrate 112, extend along a second direction 124 different from the first direction 122, and intersect with and are insulated from the data lines 106. The touch sensing lines 108 may overlap and couple with the data lines 106 to form respective sensing capacitors Csen. The gate lines 114 extend along the second direction 124, and intersect with yet are insulated from the data lines 106. The TFTs 116 are disposed adjacently to intersections of the gate lines 114 and the data lines 106. Each of the TFTs 116 includes a gate 126, a gate insulation layer 128, a semiconductor island 130, a source 132 and a drain 134. Each of the gates 126 is connected to one corresponding gate line 114, i.e., the gates 126 of the TFTs 116 arranged in the same row are electrically connected to the same gate line 114. In the embodiment, the touch sensing lines 108 do not intersect with the gate lines 114, and the touch sensing lines 108, the gates 126 and the gate lines 114 may be formed by a first metal pattern layer M1. The gate insulation layer 128 covers the first metal pattern layer M1 and the first substrate 112. The semiconductor island 130 is disposed above the gate insulation layer 128 corresponding to the gates 126. For example, the semiconductor island 130 may be formed by a non-silicon, doped non-silicon, polysilicon or metal oxide semiconductor. The sources 132 and the drains 134 are disposed above the semiconductor island 130 and the gate insulation layer 128, and are disposed correspondingly to two sides of the gates 126. Further, the sources 132 are electrically connected to one corresponding data line 106, i.e., the sources 132 of the TFTs 116 arranged in the same row are electrically connected to the same data line 106. For example, the drains 132, the sources 134 and the data lines 106 are formed by a second metal pattern layer M2. The types of the TFTs 116 of the present invention may be other types apart from the examples above. In the embodiment, the first dielectric layer 118 covers the second metal pattern layer M2, the semiconductor island 130 and the gate insulation layer 128, and includes a plurality of first vias TH1 to reveal the drains 116. Thus, the pixel electrodes 120 disposed above the first dielectric layer 118 may electrically connect to the drains 134 via the respective first vias TH1. Further, the pixel electrodes 120 are extended to overlap with the corresponding gate lines 106 to form respective storage capacitors. It should be noted that, the storage capacitors of the present invention are not limited to be formed by the pixel electrodes and the gate lines. In an alternative embodiment, the array substrate may further include a plurality of common lines, and the storage capacitors may be formed by the respective pixel electrodes coupling with the corresponding common lines.

Further, the touch display panel 100 of the embodiment is a liquid crystal display (LCD) panel. In addition to the array substrate 104, the touch display panel 100 may further include a color filter substrate 136 and a liquid crystal layer 138. The array substrate 104 and the color filter substrate 136 are disposed opposite to each other, and the liquid crystal layer 138 is disposed between the array substrate 104 and the color filter substrate 136. For example, the liquid crystal material of the liquid crystal layer 138 may be twisted nematic (TN), super twisted nematic (STN), ferroelectric, magnetic, or chiral nematic twisted liquid crystals. Further, the touch display panel 100 may also be another type of display panel, e.g., an organic light emitting diode (OLED) display panel.

Further, the color filter substrate 136 may include a second substrate 140, a black matrix layer 142, a color filter layer 144, a protection layer 146 and a common electrode layer 148. The black matrix layer 142 is disposed between the second substrate 140 and the liquid crystal layer 138, and masks circuits formed by the first metal pattern layer M1 and the second metal pattern layer M2. The black matrix layer 142 may include a photoresist material or a metal material. The color filter layer 144 is disposed correspondingly to the pixel electrodes 120 and between the second substrate 140 and the liquid crystal layer 138, and extends to be between the black matrix layer 142 and the liquid crystal layer 138. The protection layer 146 covers the black matrix layer 142 and the color filter layer 144 to protect the black matrix layer 142 and the color filter layer 144. The common electrode layer 148 is disposed between the protection layer 146 and the liquid crystal layer 138.

Figure 4:
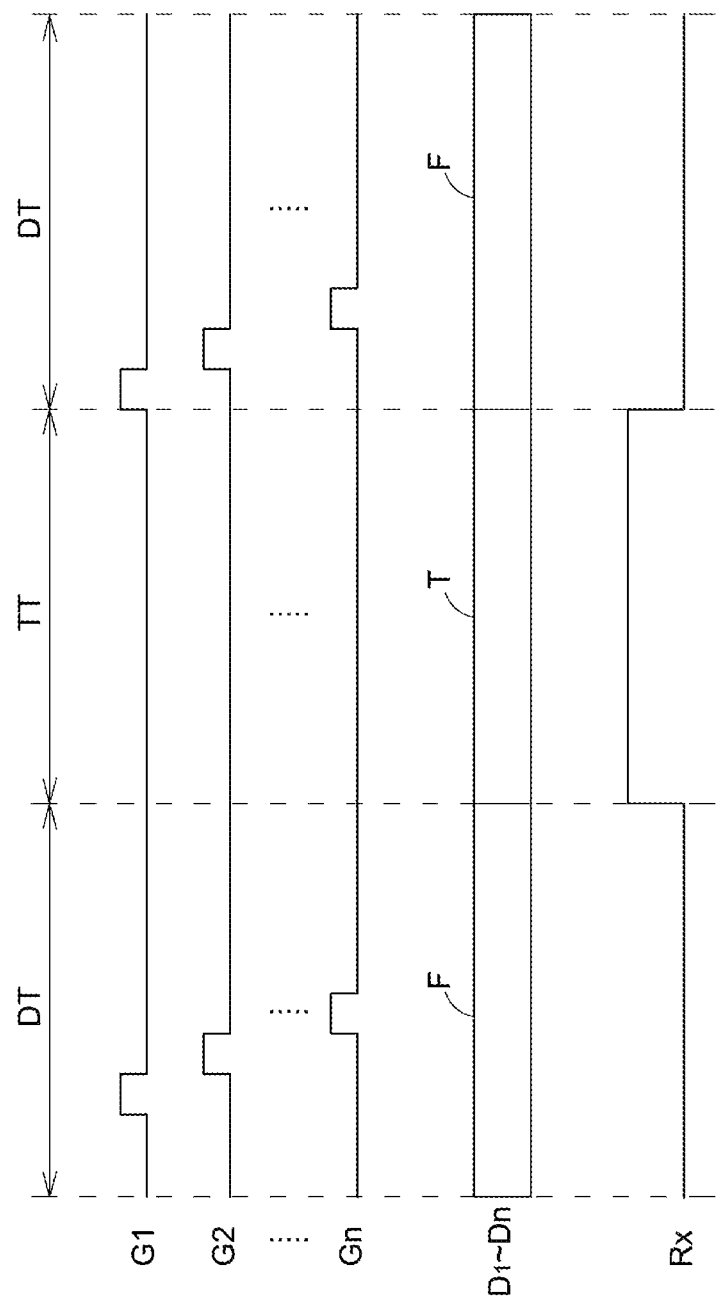
FIG. 4 is a timing diagram of a pixel switch signal transmitted by a gate line, an integrated signal including a touch control signal and a pixel voltage signal transmitted by a data line, and a sensing signal sensed by a touch sensing line of the present invention.

Details of how the touch display panel 100 of the embodiment simultaneously provides image display and touch sensing functions are given below. As shown in FIG. 4, in this embodiment, touch driving signals T and pixel voltage signals F are integrated into integrated signals D1 to Dn, which equal to the pixel voltage signals F in a display period DT and the touch driving signals T in a touch control period TT. The data lines 106 transmit at least one pixel voltage signal F in the display period DT and transmit at least one touch driving signal T in the touch control period TT. Further, the gate lines 114 transmit at least one of the pixel switch signals G1 to Gn in the display period DT, and do not transmit the pixel switch signals G1 to Gn in the touch control period TT. The control element 110 receives the sensing signals Rx sensed by the touch sensing lines 108 in the touch control period TT. It should be noted that, in the embodiment, the display period DT and the touch control period TT do not overlap, and therefore images displayed by the touch display panel 100 are not interfered by touch sensing. In the embodiment, the display period DT lasts for a period of one image of the touch display panel 100, and so the touch display panel 100 may transmit the touch driving signals T to the data lines 106 between the display periods DT of different images and also receive the sensing signals Rx. In another embodiment, the display period may be divided into two periods, which respectively correspond to different pixel switch signals in the same image. The touch control period may be between periods of any two adjacent pixel switch signals, so that the displayed image is not interfered by the touch driving signals.

It should be noted that, in the touch display panel 100 of the embodiment, as the data lines 106 may be utilized to transmit the integrated signals D1 to Dn including the touch driving signals T and the pixel voltage signals F, not only the data lines 106 can transmit the pixel voltage signals F for displaying pixels, but they can also form touch sensing elements 102 with the touch sensing lines 108. Thus, when the user approaches the touch display panel 100 from the side of the array substrate 104, the touch display panel 100 is still capable of realizing touch sensing although the touch electrode layer originally for transmitting the touch driving signals T is eliminated, thereby effectively reducing the thickness, weight and production costs of the touch display panel 100.

The touch display panel of the present invention is not limited to the above embodiment. Other embodiments of the present invention are to be disclosed below. For the sake of simplicity and to emphasize differences or variations between the embodiments, same denotations are given to the same elements, with the associated description omitted herein.

Figure 5:
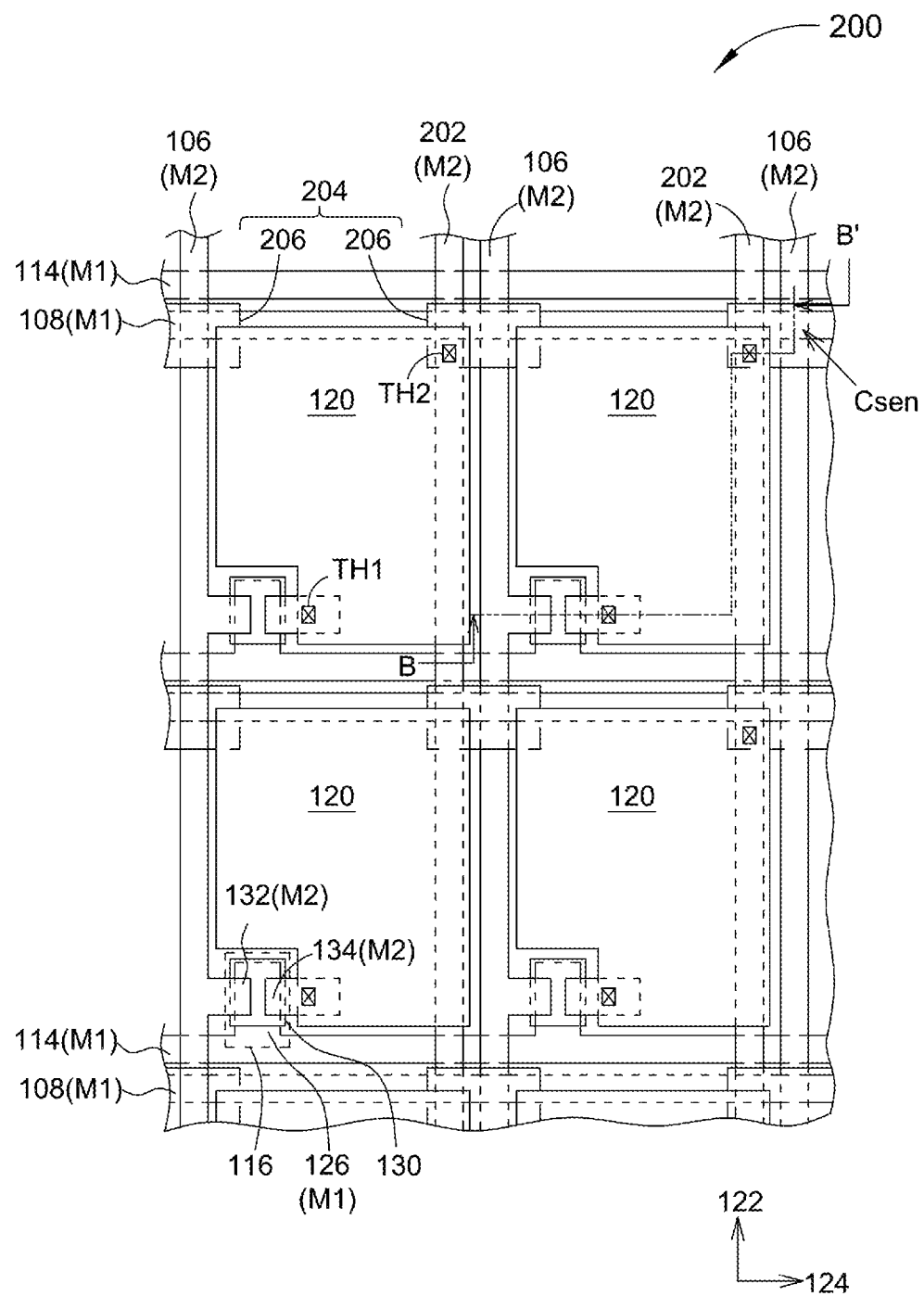
FIG. 5 is a top view of an array substrate according to a second embodiment of the present invention.
Figure 6:
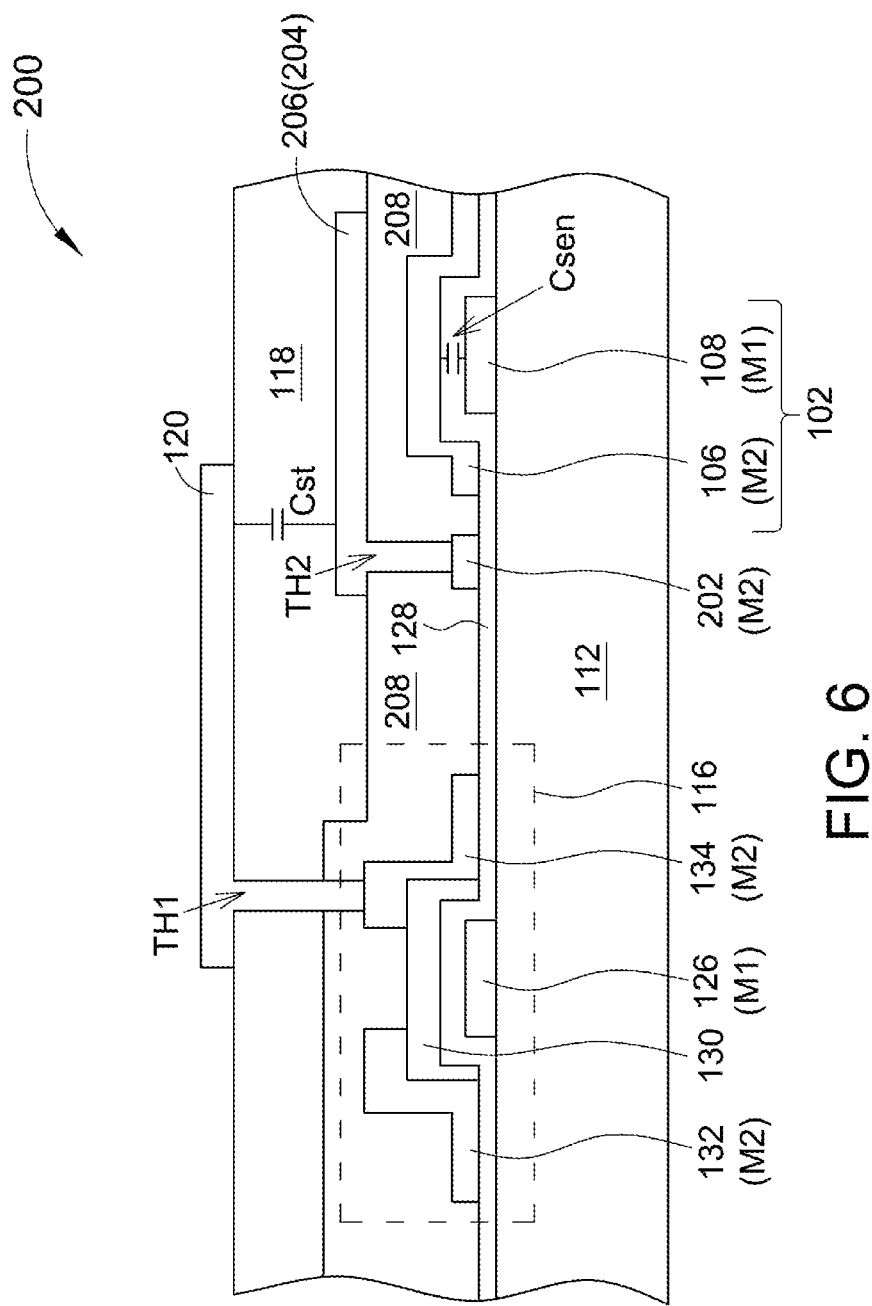
FIG. 6 a section view along a section line B-B' in FIG. 5.

Referring to FIG. 5 and FIG. 6 corresponding to a second embodiment of the present invention, a main difference of the embodiment from the first embodiment is that, an array substrate 200 of the embodiment further includes a plurality of common lines 202 and a shielding pattern 204. The common lines 202 are disposed above the first substrate 112, and are electrically connected to one another. For example, the common lines 202 may be electrically connected to ground, or electrically connected to a low potential. It should be noted that, the shielding pattern 204 is disposed between the touch sensing elements 102 and the pixel electrodes 120, in a way that the shielding pattern 204 shields the touch sensing driving signals T and the sensing signals Rx of the touch sensing elements 102 from the affecting the voltages of the pixel electrodes 120. Thus, display and touch control operations of the touch display panels 200 do not interfere with each other. In the embodiment, the shielding pattern 204 may be electrically connected to the common lines 202 to provide the shielding pattern 204 with a same potential as the common lines 202, so as to effectively shield the signals of touch sensing elements 102 from interfering with the pixel voltages. Further, the shielding pattern 204 may include a plurality of shielding portions 206, which are respectively disposed between parts at which the pixel electrodes 120 overlap with the touch sensing lines 108 and the data lines 106, so as to effectively prevent the sensing capacitors Csen formed by the touch sensing lines 108 and the data lines 106 from interfering with the voltages of the pixel electrodes 120. Therefore, the shielding portions 206 at least cover the sensing capacitors Csen. Further, the shielding portions 206 may overlap with the pixel electrodes 120 to further couple to form storage capacitors Cst. Thus, the areas of the shielding portions 206 may be determined by the sizes of the storage capacitors Cst.

For example, the common lines 202 may be formed by the second metal pattern layer M2, and extend along the first direction 122. The array substrate 200 may further include a second dielectric layer 208. The second dielectric layer 208 is disposed between the second metal pattern layer M2 and the shielding pattern 204 to electrically insulated the shielding pattern 204 from the data lines 106. The shielding pattern 204 is disposed above the second dielectric layer 208. The second dielectric layer 208 includes a plurality of second vias TH2. The second vias TH2 are respectively disposed between the shielding portions 206 and the corresponding common lines 202, such that each of the shielding portions 206 is allowed to electrically connect to one of the corresponding common lines 202 via the second vias TH2. The first dielectric layer 118 covers the second dielectric layer 208 and the shielding pattern 204. The first dielectric layer 118 and the second dielectric layer 208 include the first vias TH1, so that the pixel electrodes 120 may electrically connect to the drains 134 via the first vias TH1. In an alternative embodiment, the common lines may also be formed by the first metal pattern layer, and extend along the second direction. At this point, the second dielectric layer and the gate insulation layer may include the second vias TH2, and each of the shielding portions is electrically connected to one of the corresponding common lines via the second vias.

Figure 7:
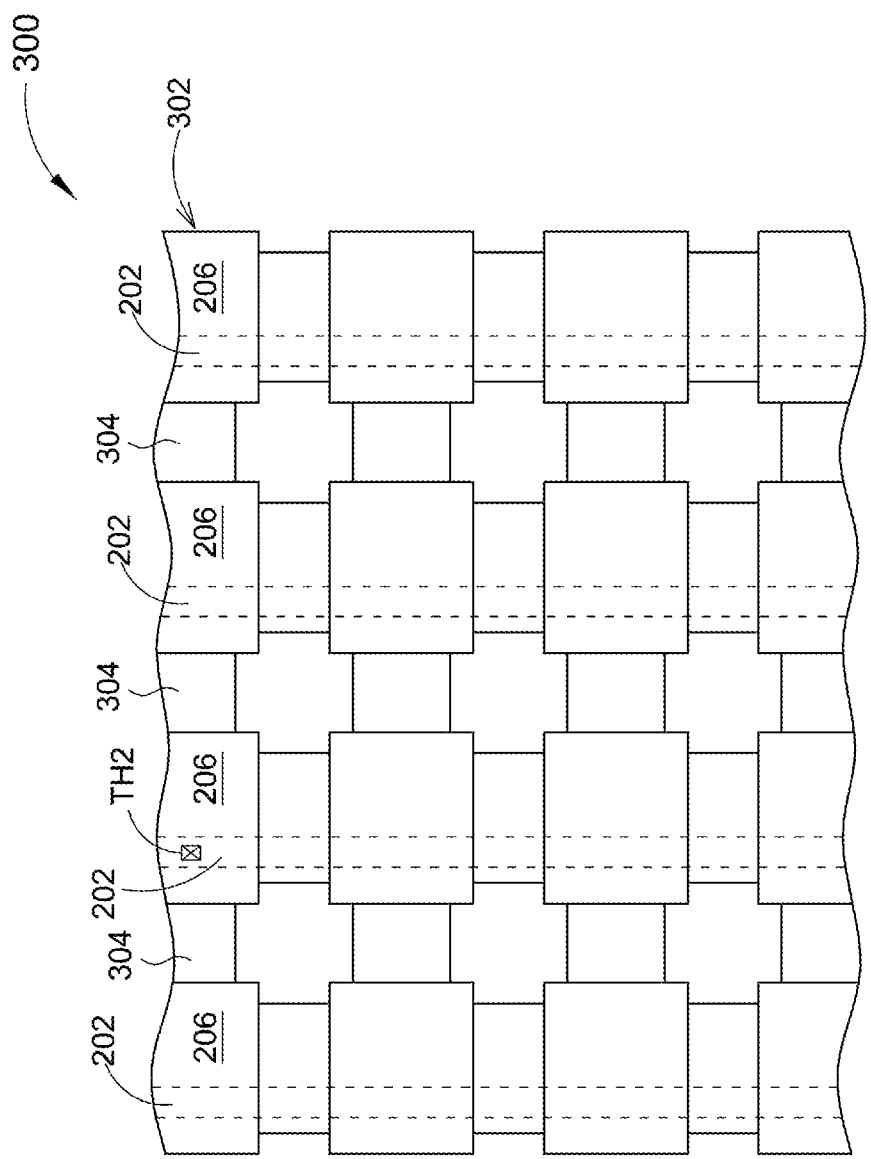
FIG. 7 is a top view of an array substrate according to a third embodiment of the present invention.

FIG. 7 shows a top view of an array substrate according to a third embodiment of the present invention. A main difference of the embodiment from the second embodiment is that, a shielding pattern 302 of an array substrate 300 further includes a plurality of connecting portions 304, each of which connects any two adjacent shielding portions 206. As such, the shielding portions 206 may be electrically connected to one another via the connecting portions 304. The array substrate 300 may include at least one common line 202, the second dielectric layer may include at least one second via TH2, and the shielding pattern 302 may electrically connect to the common line 202 via the second via TH2. More specifically, as the shielding portions 206 and the connecting portions 304 are electrically connected to each other, the array substrate 300 may include only one single common line 202. Further, the second dielectric layer may include only one single second via TH2, and so the shielding pattern 302 may electrically connect to the common line 302 via the second via TH2. In another embodiment, the array substrate may include a plurality of common lines, which may electrically connect to the shielding pattern via the second via.

Figure 8:
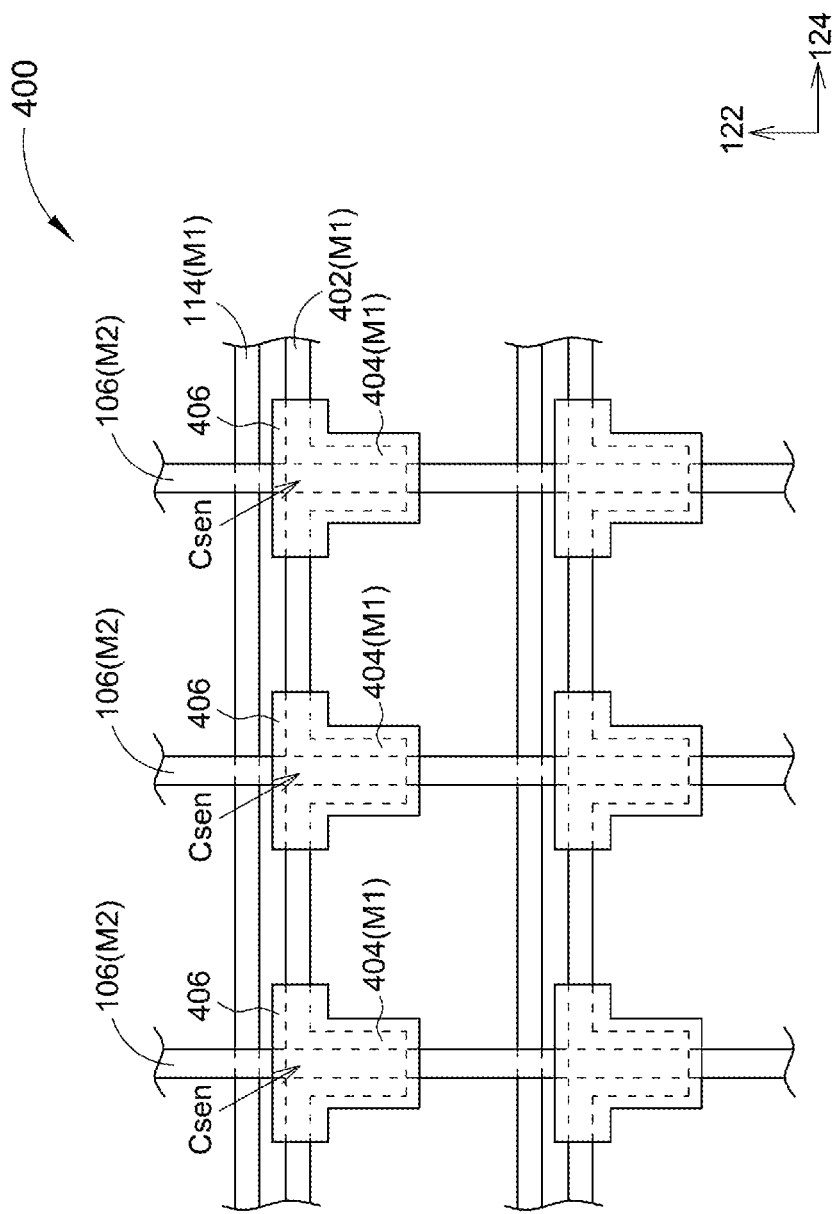
FIG. 8 is a top view of an array substrate according to a fourth embodiment of the present invention.

FIG. 8 shows a top view of an array substrate according to a fourth embodiment of the present invention. A main difference of the embodiment from the second embodiment is that, touch sensing lines 402 of an array substrate 400 further include a plurality of extension portions 404, which extend along the first direction 122. Further, the extension portions 404 of the touch sensing lines 402 overlap with the data lines 106. Accordingly, the overlapping areas of the touch sensing lines 402 and the data lines 106 may be increased to further increase the sensing capacitance as well as the sensing capabilities of the touch sensing elements. In the embodiment, to prevent the touch sensing elements from interfering with the pixel electrodes, the shielding portions 406 may be T-shaped and extend to cover the extension portions 404.

Figure 9:
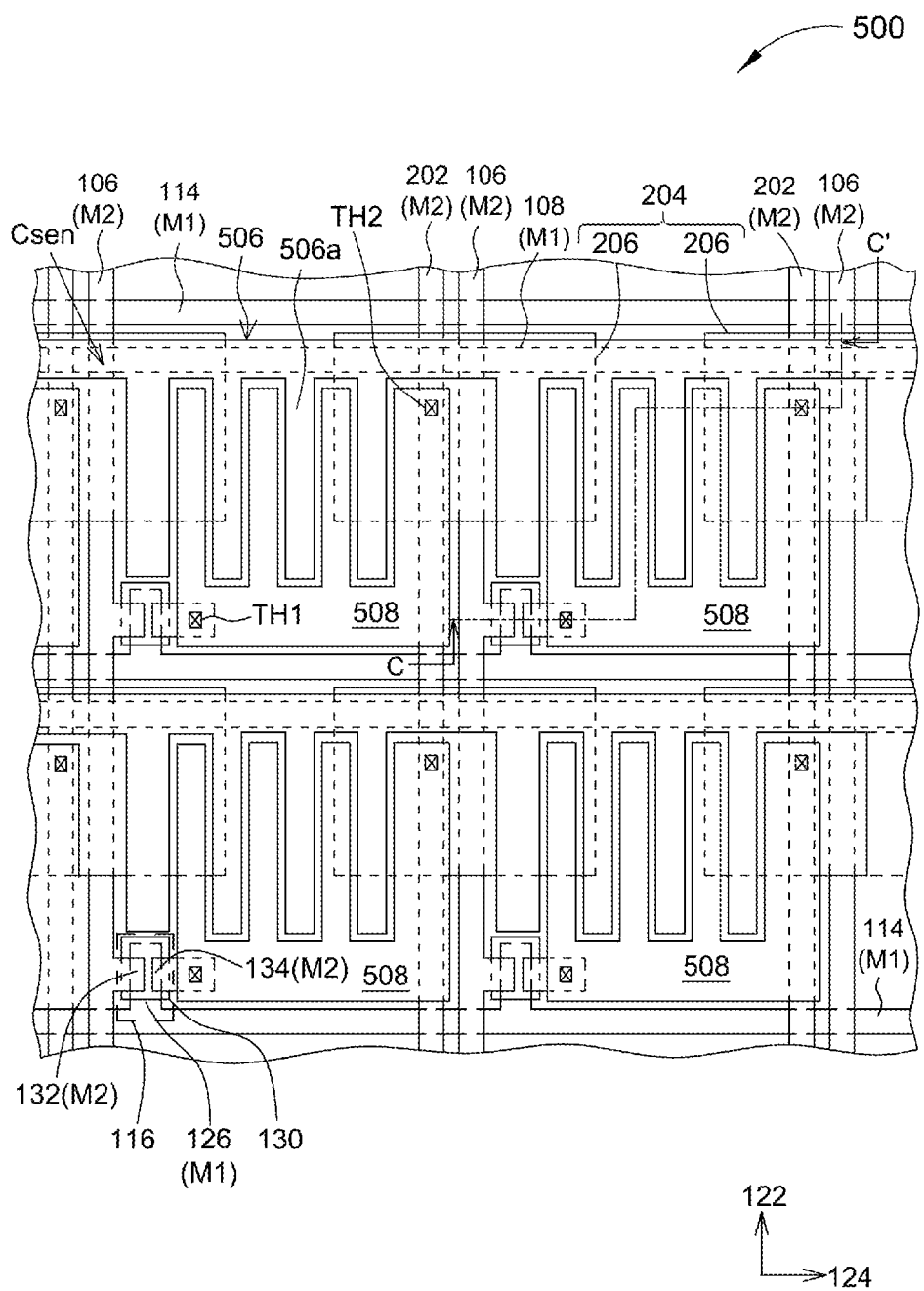
FIG. 9 is a top view of a touch display panel according to a fifth embodiment of the present invention.
Figure 10:
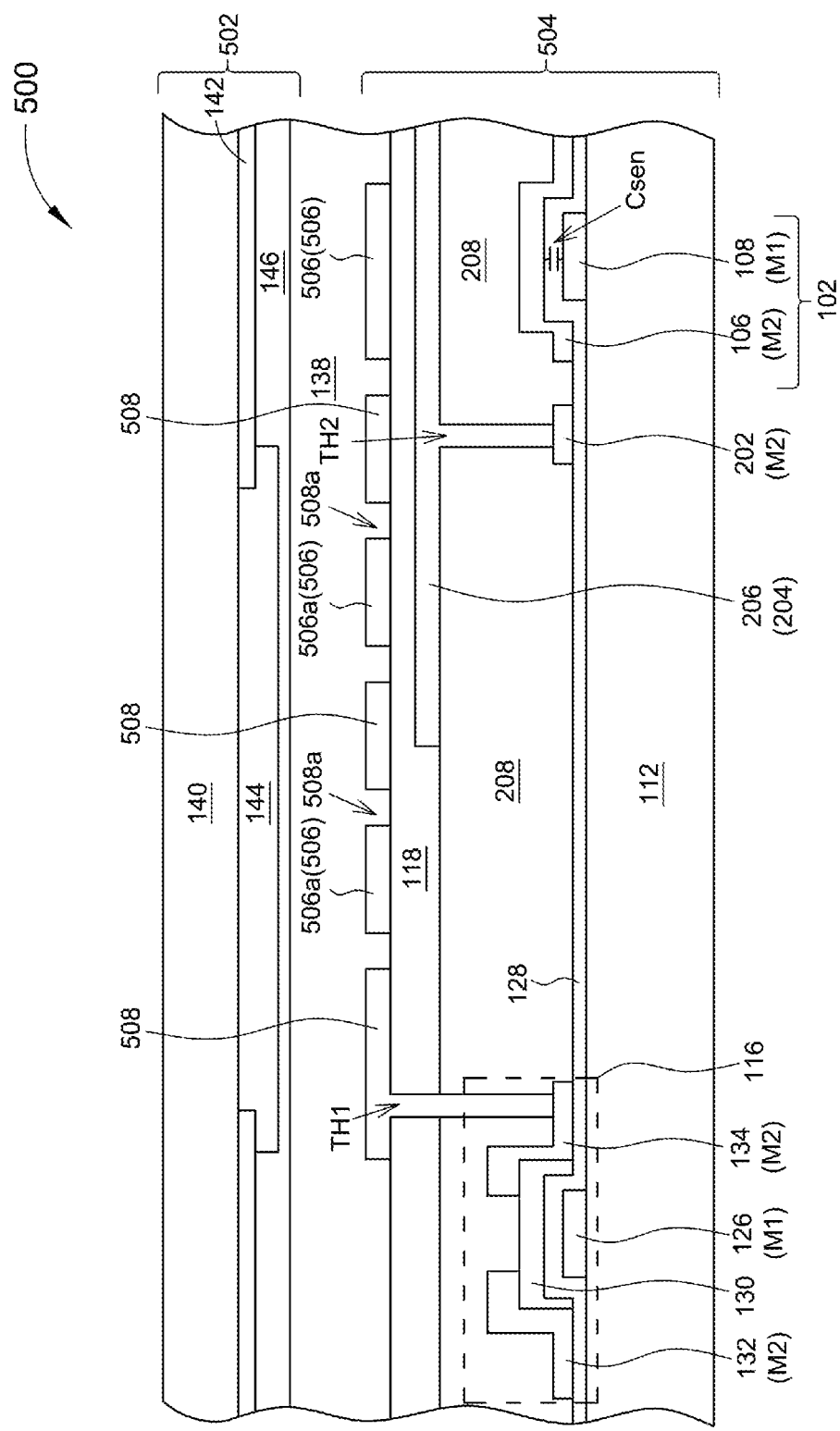
FIG. 10 is a section view along a section line C-C' in FIG. 9.

Referring to FIG. 9 and FIG. 10 corresponding to a fifth embodiment of the present invention, a main difference of the fifth embodiment from the second embodiment is that, a touch display panel 500 is an in-plane switching (IPS) display panel. More specifically, a color filter substrate 502 does not include a common electrode layer, and an array substrate 504 may further include a common electrode pattern 506 disposed between the first substrate 112 and the liquid crystal layer 138. Further, pixel electrodes 508 may include a plurality of gaps 508a, and the common electrode pattern 506 may include a plurality of protruding portions 506a respectively extended into the gaps 508a. In the embodiment, the second substrate 140, the liquid crystal layer 138, the black matrix layer 142, the color filter layer 144 and the protection layer 146 are identical to those in the second embodiment, and the associated description shall be omitted herein. In another embodiment, the touch display panel in the first embodiment, the third embodiment and the fourth embodiment may also be an IPS display panel.

Figure 11:
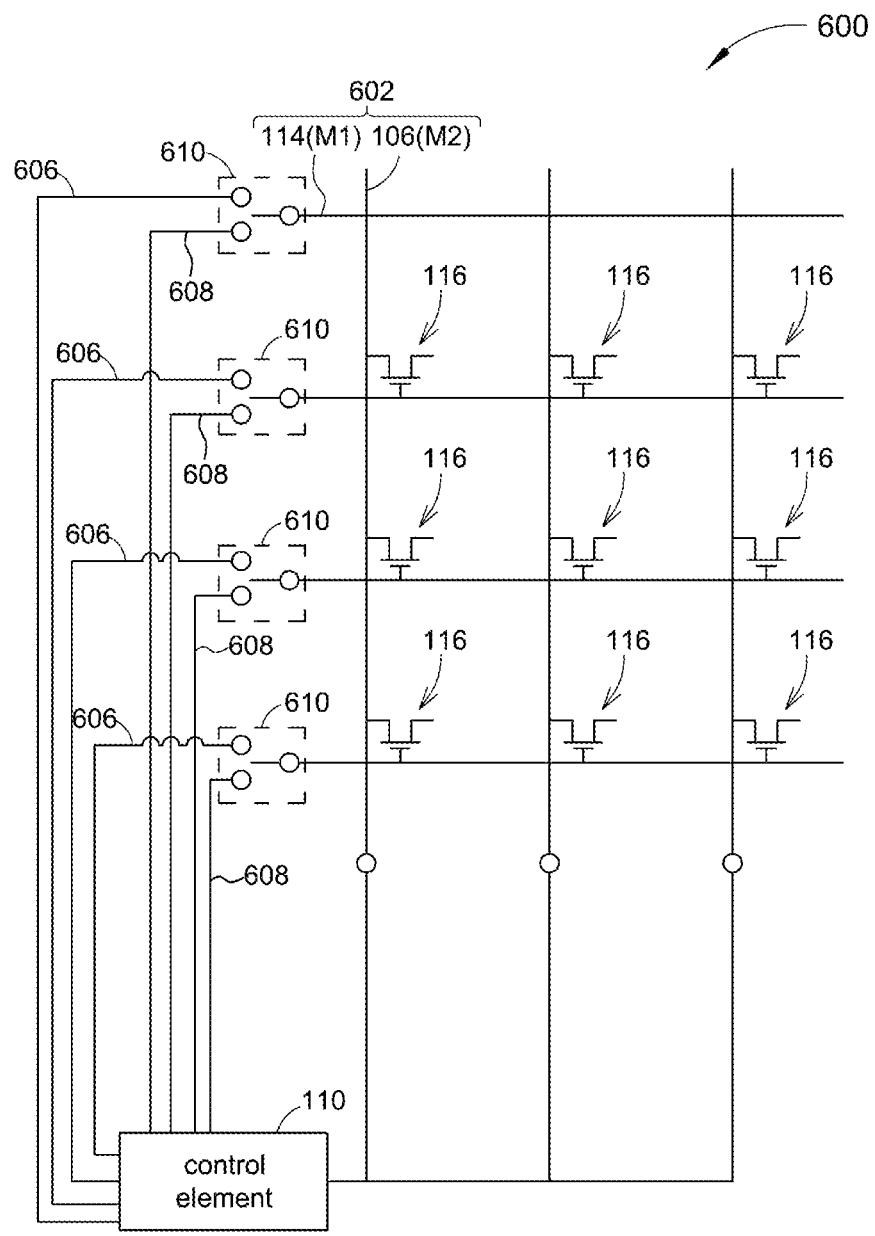
FIG. 11 is a circuit diagram of a touch display panel according to a sixth embodiment of the present invention.
Figure 12:
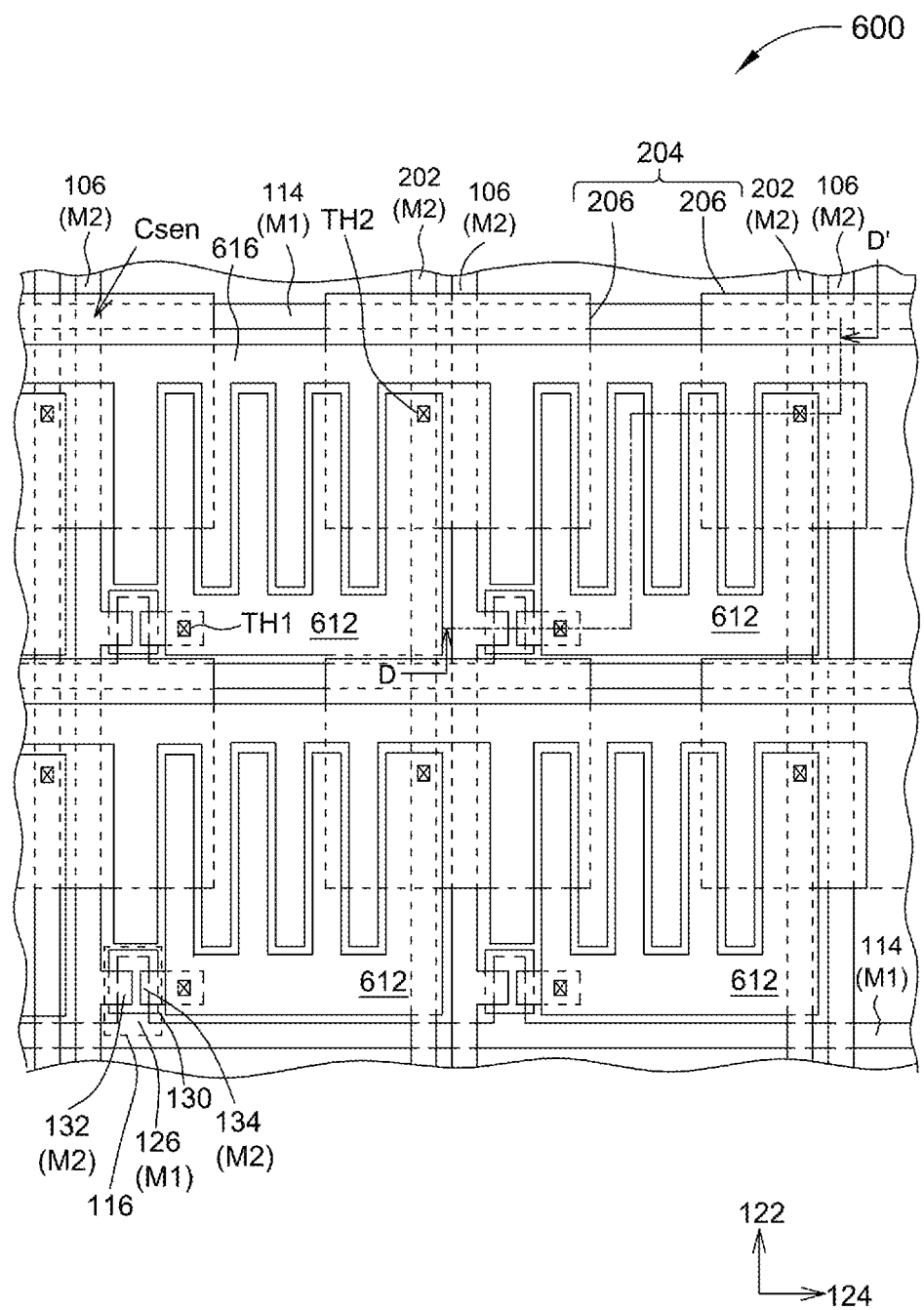
FIG. 12 is a top view of a touch display panel according to the sixth embodiment of the present invention.
Figure 13:
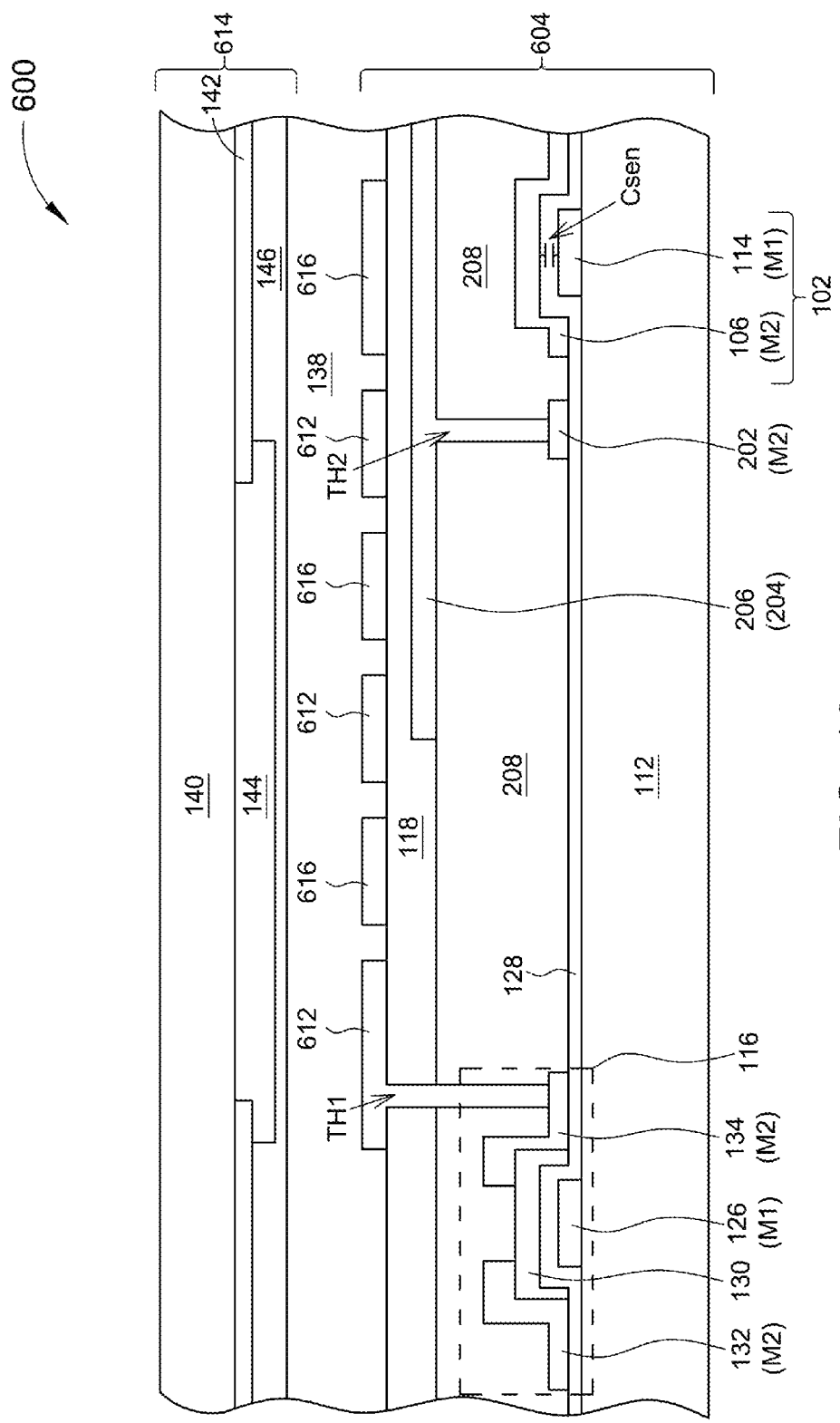
FIG. 13 is a section view along a section line D-D' in FIG. 12.

Referring to FIG. 11 to FIG. 13 corresponding to a sixth embodiment of the present invention, a main difference of the embodiment from the second embodiment is that, touch sensing elements 602 are formed by gate lines 114 and data lines 106 that intersect each other. Thus, an array substrate 604 does not include touch control lines. In the embodiment, the data lines 106 may still be utilized to transmit the touch driving signals, and the gate lines may form the sensing capacitors Csen by coupling with the data lines 106 to sense the touch driving signals to further transmit the sensing signals. It should be noted that, the gate lines 114 may also be utilized to transmit the pixel switch signals at time points different from those at which the sensing signals are transmitted to switch the TFTs 116 of the pixels. In the embodiment, the data lines 106 and the gate lines 114 are electrically connected to the control element 110. In addition to providing the integrated signals including the touch driving signals and the pixel voltage signal, the control element 110 may further transmit the pixel switch signals to the gate lines 114 via first conducting lines 606 and receive the sensing signals from the gate lines 114 via second conducting lines 608 at different time points. An array substrate 604 may further include a plurality of switching elements 610 connected to the gate lines 114, the first conducting lines 606 and the second conducting lines 608. When the gate lines 114 transmit the pixel switch signals, the switching elements 610 switch and electrically connect the gate lines 114 to the first conducting lines 606; when the gate lines 114 transmit the sensing signals, the switching elements 610 switch and electrically connect the gate lines 114 to the second conducting lines 608. It should be noted that the above examples are for explaining the present invention and are not to be construed as limitations to the present invention. Further, the shielding portions 206 of the shielding pattern 204 are disposed between parts at which pixel electrodes 612 overlap with the gate lines 114 and the data lines 106, so as to effectively prevent the sensing capacitors Csen formed by the gate lines 114 and the data lines 106 from interfering with the voltages of the pixel electrodes 612. In the embodiment, the TFTs 116, the gate lines 114, the data lines 106, the common lines 202, the first vias TH1 and the second vias TH2 are identical to those in the second embodiment, and the associated description shall be omitted herein.

In the embodiment, the touch display panel 600 is an IPS display panel. Thus, a color filter substrate 614 does not include a common electrode layer, and the array substrate 604 may further include a common electrode pattern 616 disposed between the first substrate 112 and the liquid crystal layer 138. In the embodiment, the second substrate 140, the black matrix layer 142, the color filter layer 144, the protection layer 146, the common electrode pattern 616 and the pixel electrodes 612 are identical to those in the fifth embodiment, and the associated description shall be omitted herein. In another embodiment, the touch display panel may be a TN display panel. That is, the color filter substrate includes a common electrode layer, the array substrate does not include a common electrode pattern, and the pixel electrodes do not include gaps.

Details of how the touch display panel of the embodiment simultaneously provides image display and touch sensing functions are given below. Referring to FIG. 4, compared to the first embodiment, the sensing signals Rx of the embodiment are sensed by the gate lines 114. The gate lines 114 transmit at least one of the pixel switch signals G1 to Gn in the display period DT, and transmit the sensing signals Rx instead of the pixel switch signals G1 to Gn in the touch control period TT. More specifically, in the display period DT, the switching elements 610 switch and electrically connect the gate lines 114 to the first conducting lines 606. Thus, the control element 110 transmit the pixel switch signals G1 to Gn to the gate lines 114 via the first conducting lines 606, and transmit the pixel voltage signals F to the data lines 106. In the touch control period TT, the control element 110 transmits the touch driving signals T to the data lines 106, and the switching elements 610 switch and electrically connect the gate lines 114 to the second conducting lines 608. Thus, the control element 110 may receive the sensing signals Rx sensed by the gate lines 114 via the second conducting lines 608. It should be noted that, in the embodiment, the display period DT and the touch control period TT do not overlap, and so the images displayed by the touch display panel 600 are interfered by touch sensing. In the embodiment, the display period DT is the period of one image displayed by the touch display panel 600, and so the touch display panel 600 may transmit the touch driving signals T to the data lines 106 between the display periods DT of different images and also receive the sensing signals Rx. In another embodiment, the display period may be divided into two periods, which respectively correspond to different pixel switch signals in the same image. The touch control period may be between periods of any two adjacent pixel switch signals, so that the display image is not interfered by the touch driving signals. Further, in another embodiment, the pixel switch signals and the sensing signals may be integrated into integrated signals, which are the pixel switch signals in the display period and the sensing signals in the touch control period. Further, the array substrate is not required to include the switching elements, and the control element may be directly electrically connected to the gate lines.

It should be noted that, in the touch display panel 600, the data lines may be utilized to transmit the integrated signals including the touch driving signals T and the pixel voltage signals F, and the gate lines 114 may be utilized to transmit the pixel switch signals G1 to Gn and the sensing signals Rx sensed. Therefore, the data lines 106 and the gate lines 114 not only can be respectively utilized to display images but also form the touch sensing elements 602 for sensing a position of a touch object. As such, when the user approaches the touch display panel 600 from the side of the first substrate 112, the touch display panel 600 is still capable of realizing touch sensing although the touch electrode layer originally for transmitting the touch driving signals is eliminated, thereby effectively reducing the thickness, weight and production costs of the touch display panel 600.

In another embodiment, the shielding pattern may further include a plurality of connecting portions, each of which connects any two adjacent shielding portions, as shown in FIG. 7. Further, the array substrate may include at least one common line, the second dielectric layer may include at least one second via, and the shielding pattern is electrically connected to the common line via the second via.

Figure 14:
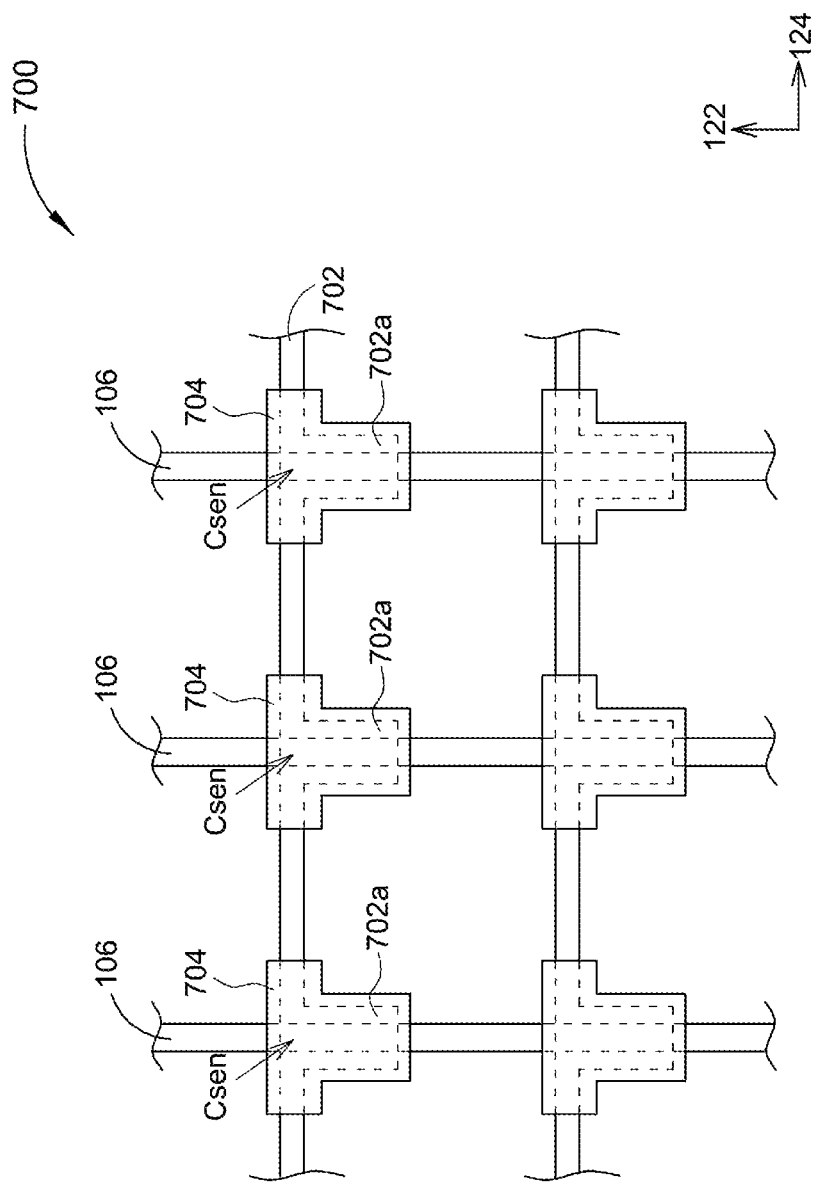
FIG. 14 is a top view of an array substrate according to a seventh embodiment of the present invention.

FIG. 14 shows a top view of an array substrate according to a seventh embodiment of the present invention. A main difference of the embodiment from the sixth embodiment is that, gate lines 702 of an array substrate 702 further include a plurality of extension portions 702a that extend along the first direction 122. Further, the extension portions 702a of the gate lines 702 overlap with the data lines 106. Accordingly, the overlapping areas of the gate lines 702 and the data lines 106 may be increased through the extension portions 702a to further increase the sensing capacitors Csen as well as the sensing capabilities of the touch sensing elements. In the embodiment, to prevent the touch sensing elements from interfering with the pixel electrodes, the shielding portions 704 may also extend to cover the extension portions 702a.

Figure 15:
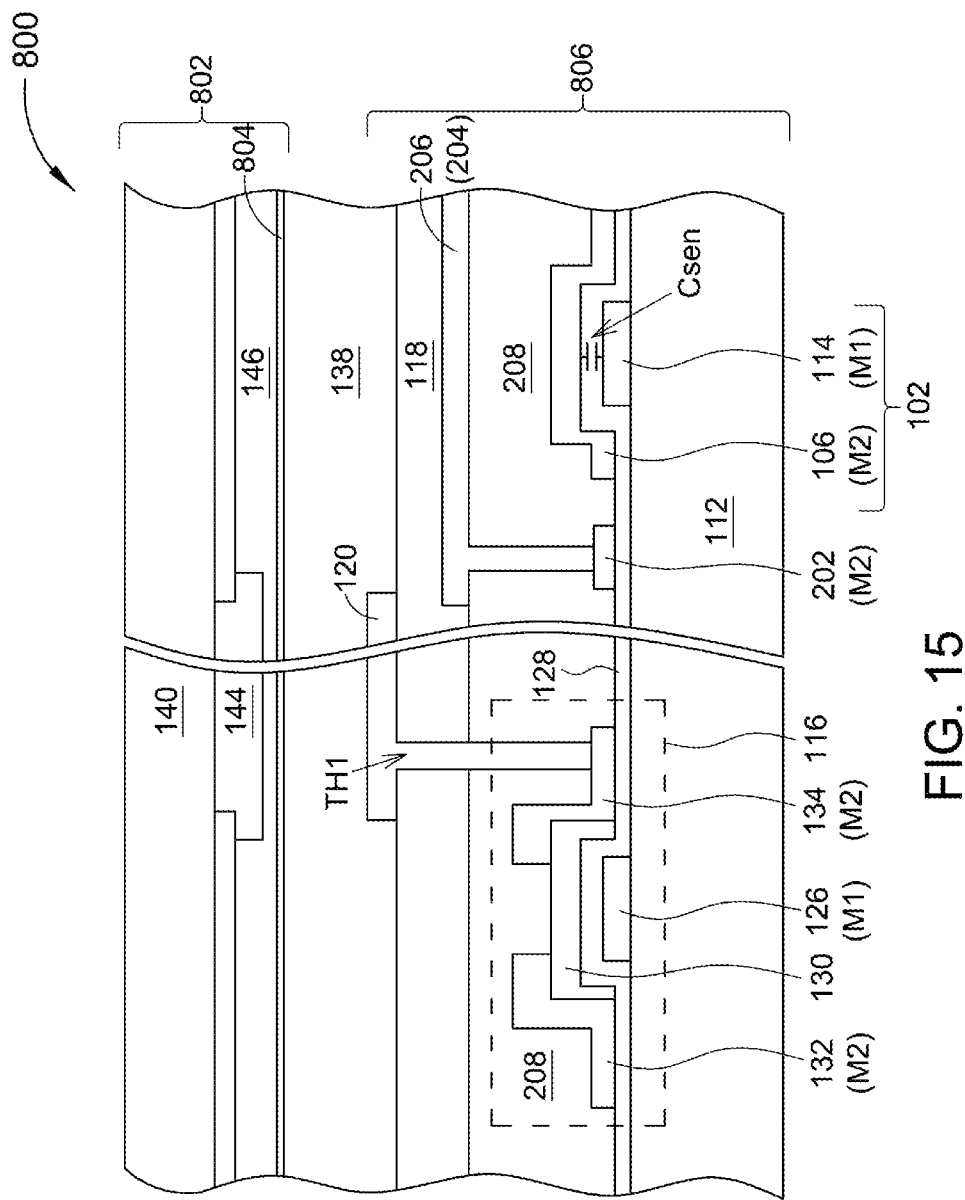
FIG. 15 is a top view of a touch display panel according to an eight embodiment of the present invention.

FIG. 15 shows a top view of a touch display panel according to an eighth embodiment of the present invention. A main difference of the embodiment from the sixth embodiment is that, a touch display panel 800 is a TN display panel. That is to say, in addition to the second substrate 140, the black matrix layer 142, the color filter layer 144 and the protection layer 146, a color filter substrate 802 further includes a common electrode layer 804. Thus, an array substrate 806 does not include a common electrode pattern, and the pixel electrodes do not include gaps. In the embodiment, the second substrate 140, the liquid crystal layer 138, the black matrix layer 142, the color filter layer 144, the protection layer 146, and the first substrate 112, the TFTs 116 and the touch sensing elements 602 of the array substrate 806 are identical to those in the sixth embodiment, and the associated description shall be omitted herein. In another embodiment, the touch display panel in the seventh embodiment may also be a TN display panel.

In conclusion, in the touch display panel of the present invention, as the data lines may be utilized to transmit the integrated signals including the touch driving signals and the pixel voltage signals, and the gate lines or the touch sensing lines may be utilized to transmit the sensing signals, the data lines and the gate lines or the touch sensing lines may form touch sensing elements. As such, the touch display panel of the present invention may eliminate a touch electrode layer originally for transmitting the touch driving signals, thereby effectively reducing the thickness, weight and production costs of the touch display panel.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display panel, comprising:
   a first substrate;
   a plurality of data lines, disposed above the first substrate, extending along a first direction;
   a plurality of touch sensing lines, disposed above the first substrate, extending along a second direction and intersecting with the plurality of data lines to form a plurality of touch sensing elements;
   a plurality of gate lines, disposed above the first substrate, extending along the second direction and intersecting with the data lines; and
   a plurality of thin-film transistors (TFTs), disposed above the first substrate, disposed adjacently to intersections of the gate lines and the data lines, each of the TFTs comprising a gate, a source and a drain, each of the gates electrically connected to one of the adjacent gate lines, the sources electrically connected to one of the adjacent data lines,
   wherein the data lines transmit at least one pixel voltage signal in a display period, and transmit at least one touch driving signal in a touch control period, and the display period does not overlap with the touch control period.

2. The touch display panel according to claim 1, further comprising:
   a plurality of pixel electrodes, disposed above the first substrate, electrically connected to the drains;
   at least one common line, disposed above the first substrate, extending along the first direction; and
   a shielding pattern, disposed between the touch sensing elements and the pixel electrodes, electrically connected to the at least one common line.

3. The touch display panel according to claim 2, wherein the shielding pattern comprises a plurality of shielding portions, and the shielding portions are disposed between parts at which the pixel electrodes overlap with the touch sensing lines and the data lines.

4. The touch display panel according to claim 3, wherein the shielding pattern further comprises a plurality of connecting portions, and each of the connecting portions connects any two of the adjacent shielding portions.

5. The touch display panel according to claim 4, further comprising:
   a dielectric layer, disposed between the at least one common line and the shielding pattern, comprising at least one via;
   wherein, the shielding pattern is electrically connected to the at least one common line via the at least one via.

6. The touch display panel according to claim 2, further comprising:
   a second substrate, disposed opposite to the first substrate;
   a liquid crystal layer, disposed between the first substrate and the second substrate;
   a black matrix layer, disposed between the second substrate and the liquid crystal layer;

a color filter layer, disposed between the second substrate and the liquid crystal layer; and a common electrode pattern, disposed between the first substrate and the liquid crystal layer;

wherein, the pixel electrodes comprise a plurality of gaps, and the common electrode pattern extends into the gaps.

7. The touch display panel according to claim 2, further comprising:

a second substrate, disposed opposite to the first substrate;

a liquid crystal layer, disposed between the first substrate and the second substrate;

a black matrix layer, disposed between the second substrate and the liquid crystal layer;

a color filter layer, disposed between the second substrate and the liquid crystal layer; and a common electrode pattern, disposed between the second substrate and the liquid crystal layer.

8. The touch display panel according to claim 1, wherein the touch sensing lines further comprise a plurality of extension portions, and the extension portions of the touch sensing lines overlap with the data lines.

9. A touch display panel, comprising:

a first substrate;

a plurality of data lines, disposed above the first substrate, extending along a first direction;

a plurality of gate lines, disposed above the first substrate, extending along a second direction and intersecting with the data lines, to form a plurality of touch sensing elements;

a plurality of thin-film transistors (TFTs), disposed above the first substrate, disposed adjacently to intersections of the gate lines and the data lines, each of the TFTs comprising a gate, a source and a drain, each of the gates electrically connected to one of the adjacent gate lines, the sources electrically connected to one of the adjacent data lines;

a plurality of pixel electrodes, disposed above the first substrate, electrically connected to the drains;

at least one common line, disposed above the first substrate, extending along the first direction; and a shielding pattern, disposed between the touch sensing elements and the pixel electrodes, electrically connected to the at least one common line, wherein the data lines transmit at least one pixel voltage signal in a display period, and transmit at least one touch driving signal in a touch control period, and the display period does not overlap with the touch control period.

10. The touch display panel according to claim 9, wherein the shielding pattern comprises a plurality of shielding portions, and the shielding portions are disposed between parts at which the pixel electrodes overlap with the touch sensing lines and the data lines.

11. The touch display panel according to claim 10, wherein the shielding pattern further comprises a plurality of connecting portions, and each of the connecting portions connects any two of the adjacent shielding portions.

12. The touch display panel according to claim 11, further comprising:

a dielectric layer, disposed between the at least one common line and the shielding pattern, comprising at least one via;

wherein, the shielding pattern is electrically connected to the at least one common line via the at least one via, and the shielding portions are electrically connected to at least one of the common lines via the vias.

13. The touch display panel according to claim 9, wherein the gate lines transmit at least one pixel switch signal in a display period and stop transmitting the at least one pixel switch signal in a touch control period, and the display period does not overlap with the touch control period.

14. The touch display panel according to claim 9, further comprising:

a second substrate, disposed opposite to the first substrate;

a liquid crystal layer, disposed between the first substrate and the second substrate;

a black matrix layer, disposed between the second substrate and the liquid crystal layer;

a color filter layer, disposed between the second substrate and the liquid crystal layer; and a common electrode pattern, disposed between the first substrate and the liquid crystal layer;

wherein, the pixel electrodes comprise a plurality of gaps, and the common electrode pattern extends into the gaps.

15. The touch display panel according to claim 9, further comprising:

a second substrate, disposed opposite to the first substrate;

a liquid crystal layer, disposed between the first substrate and the second substrate;

a black matrix layer, disposed between the second substrate and the liquid crystal layer;

a color filter layer, disposed between the second substrate and the liquid crystal layer; and a common electrode pattern, disposed between the second substrate and the liquid crystal layer.

16. The touch display panel according to claim 9, wherein the touch sensing lines further comprise a plurality of extension portions, and the extension portions of the touch sensing lines overlap with the data lines.

* * * * *